United States Patent
Caunter

(10) Patent No.: US 9,516,355 B2
(45) Date of Patent: Dec. 6, 2016

(54) DISCOVERING AND CONTROLLING MULTIPLE MEDIA RENDERING DEVICES UTILIZING DIFFERENT NETWORKING PROTOCOLS

(71) Applicant: QUALCOMM Incorporated, San Diego, CA (US)

(72) Inventor: Mark Leslie Caunter, Christchurch (GB)

(73) Assignee: QUALCOMM Incorporated, San Diego, CA (US)

( * ) Notice: Subject to any disclaimer, the term of this patent is extended or adjusted under 35 U.S.C. 154(b) by 139 days.

(21) Appl. No.: 14/018,054

(22) Filed: Sep. 4, 2013

(65) Prior Publication Data
US 2015/0067751 A1    Mar. 5, 2015

(51) Int. Cl.
H04N 21/2343 (2011.01)
H04N 21/222 (2011.01)
H04N 21/2381 (2011.01)
H04L 29/08 (2006.01)
H04L 29/06 (2006.01)
H04L 12/28 (2006.01)

(52) U.S. Cl.
CPC ........ *H04N 21/2343* (2013.01); *H04L 12/281* (2013.01); *H04L 65/105* (2013.01); *H04L 67/16* (2013.01); *H04L 67/2823* (2013.01); *H04L 69/08* (2013.01); *H04N 21/222* (2013.01); *H04N 21/2381* (2013.01); *H04L 2012/2849* (2013.01)

(58) Field of Classification Search
None
See application file for complete search history.

(56) References Cited

U.S. PATENT DOCUMENTS 7,602,756 B2 * 10/2009 Gu ................... H04L 12/2805
                                                         370/338
7,788,409 B2    8/2010 Doumuki et al.
8,406,167 B2 *  3/2013 Den Hartog et al. ........ 370/328
2005/0132366 A1 6/2005 Weast
(Continued)

FOREIGN PATENT DOCUMENTS

EP    1347613     9/2003
WO    2005103914  11/2005

OTHER PUBLICATIONS

"PCT Application No. PCT/US2014/053988 International Search Report", Nov. 5, 2014, 10 pages.
(Continued)

*Primary Examiner* — Omar S Parra
(74) *Attorney, Agent, or Firm* — DeLizio Law, PLLC

(57) ABSTRACT

A virtual media rendering device acts as a proxy for physical media rendering devices that lack support for a designated common protocol such as UPnP/DLNA. The virtual device conforms to a designated common media rendering control protocol so that media rendering devices on the network that do not support the common protocol may be accessible via the common media rendering protocol through the virtual media rendering device. Requests received by the virtual media rendering device using the common protocol are converted to the media rendering control protocol used by the proxied physical media rendering device. The virtual media rendering device appears to other devices on the network as if it were a physical device.

28 Claims, 7 Drawing Sheets

(56) References Cited

U.S. PATENT DOCUMENTS

| | | |
|---|---|---|
| 2005/0220139 A1 | 10/2005 | Aholainen |
| 2007/0124447 A1* | 5/2007 | Ajitomi et al. ............... 709/223 |
| 2008/0288618 A1* | 11/2008 | Vardi .................. H04L 67/2823 709/223 |
| 2010/0138283 A1* | 6/2010 | Keum et al. .................... 705/10 |
| 2010/0313225 A1 | 12/2010 | Cholas et al. |

OTHER PUBLICATIONS

"PCT Application No. PCT/US2014/053988 International Preliminary Report on Patentability", Dec. 14, 2015, 8 pages.

* cited by examiner

DISCOVERING AND CONTROLLING MULTIPLE MEDIA RENDERING DEVICES UTILIZING DIFFERENT NETWORKING PROTOCOLS

BACKGROUND

Embodiments of the inventive subject matter generally relate to the field of media rendering devices, and, more particularly, to discovering and controlling multiple media rendering devices that use different networking protocols.

While Universal Plug and Play/Digital Living Network Alliance (UPnP/DLNA) is a protocol used by various media players or renderers, there are a number of other networking alternatives to UPnP/DLNA such as Orb's CAB protocol, AllJoyn, Wi-Fi Direct, etc. It is often the case that a home may have multiple media rendering devices from different manufacturers that conform to different media rendering control protocols. For example, a network may include an Orb media player, a UPnP/DLNA compliant television and a media server to serve content to the player and the television. In such cases multiple media rendering controllers are typically used to play media, one for the Orb media player and one for the UPnP/DLNA compliant television. As the number of media rendering devices using different control protocols grows, the more difficult and impractical it can become for a user to operate the media rendering devices due to the number of different media rendering controllers that may need to be used.

SUMMARY

Various embodiments are disclosed for discovering and controlling multiple physical media rendering devices that utilize different networking protocols. A host device may determine presence of a physical media rendering device on a network, wherein the physical media rendering device uses a first media rendering control protocol. In response to determining the presence of the physical media rendering device, the host device creates a virtual media rendering device representing the physical media rendering device. The virtual media rendering device uses a second media rendering control protocol. The second media rendering control protocol may be a protocol that is common across multiple virtual media rendering devices. The virtual media rendering device may receive a first action request that conforms to the second media rendering control protocol (i.e., the common protocol). The virtual media rendering device converts the first action request to a second action request, where the second action request conforms to the first media rendering control protocol. The second action request is transmitted to the physical media rendering device using the first media rendering control protocol.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Figure 1:
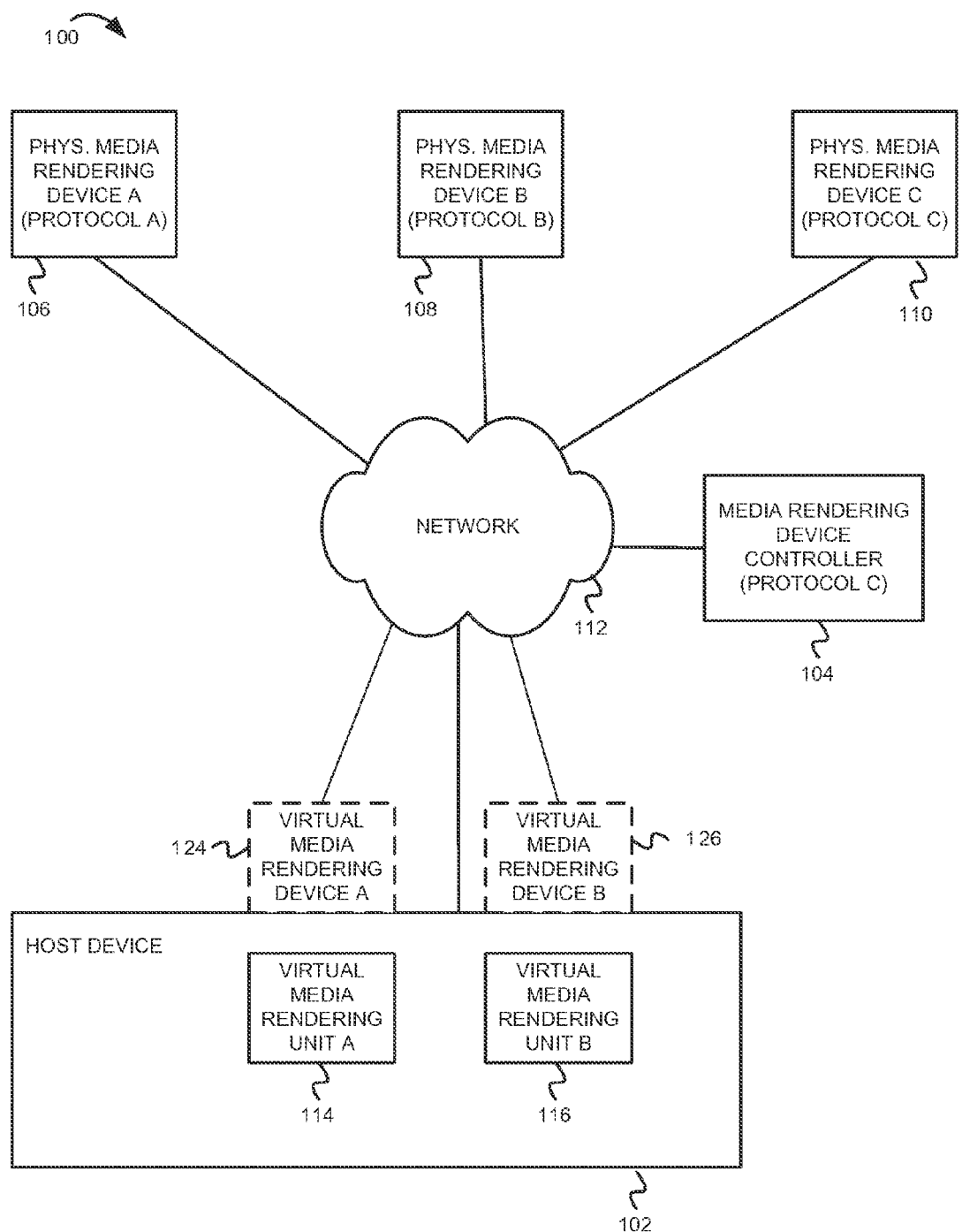
FIG. 1 is a block diagram of a system for discovering and controlling multiple physical media rendering devices that use different networking protocols.

The description that follows includes exemplary systems, methods, techniques, instruction sequences and computer program products that embody techniques of the present inventive subject matter. However, it is understood that the described embodiments may be practiced without these specific details. For instance, although examples refer to use of UPnP/DLNA as media rendering control protocol used in common by virtual media rendering devices, other protocols may be used as a common protocol. In other instances, well-known instruction instances, protocols, structures and techniques have not been shown in detail in order not to obfuscate the description.

In some embodiments, a virtual media rendering device can be implemented as a proxy for a physical media rendering device that does not support a common protocol in the network. A virtual media rendering device may also be referred to as a virtual media rendering proxy. As used herein, a "common protocol" is a protocol that may be used across a number of virtual media rendering devices created on a host device. An example of a common protocol that may be used across multiple virtual media rendering devices is UPnP/DLNA. The virtual media rendering device conforms to the common protocol and may receive action requests using the common protocol on behalf of the proxied physical media rendering device that does not support the common protocol. Action requests received by the virtual media rendering device using the common protocol can be converted to action requests that conform to the media rendering control protocol used by the proxied physical media rendering device. For example, a virtual media rendering device may conform to a UPnP/DLNA protocol and serve as a proxy for an Orb media player or an AllJoyn compliant media player. Virtual media rendering devices may be implemented by virtual media rendering units. A virtual media rendering device can provide an interface to other components of a system while the virtual media rendering unit implementing the virtual media rendering device performs operations supporting the virtual media rendering device. For example, a virtual media rendering device that conforms to the UPnP/DLNA protocol may receive a request. The virtual media rendering unit implementing the virtual media rendering device can convert the request to a protocol supported by the proxied physical media rendering device (e.g., Orb protocol or AllJoyn protocol) and transmit the converted request to the proxied physical media rendering device.

In addition, the virtual media rendering device may support a discovery protocol. The discovery protocol may be supported by the common protocol. Alternatively, the discovery protocol may be a separate protocol from the common protocol. The virtual media rendering device may announce its presence on a network or respond to discovery requests using the discovery protocol. Thus the virtual media rendering device appears to other devices and media rendering controllers on the network as if it was a physical media rendering device.

A media rendering controller that conforms to the designated common media rendering control protocol can both discover and control (through the virtual media rendering device) a physical media rendering device that the media rendering controller may otherwise be unable to discover or control. If multiple physical media rendering devices are present on a network that do not support a common protocol, multiple virtual media rendering devices may be created as proxies for the physical media rendering devices. A media rendering controller supporting the common protocol can control the physical media rendering devices through their respective virtual media rendering devices.

FIG. 1 is a block diagram of a system 100 for discovering and controlling multiple physical media rendering devices that use different media rendering control protocols. In some embodiments, system 100 includes a host device 102, one or more physical media rendering devices (e.g., physical media rendering device A 106, physical media rendering device B 108 and physical media rendering device C 110), and a media rendering device controller 104. Host device 102, media rendering device controller 104 and the one or more physical media rendering devices may be communicably coupled via network 112. Network 112 may be any type of wired or wireless network, or combination thereof. Examples of wireless networks include WLAN, BLUETOOTH® (Bluetooth), WiMAX, ZigBee®, etc. Examples of wired networks include Ethernet and powerline communication networks. The embodiments described herein are not limited to any particular wired or wireless network type, and further are not limited to networks of a particular size or geographic domain.

Physical media rendering devices A 106, B 108 and C 110 can be devices that render audio media, video media or both audio and video media. A physical media rendering device may also be referred to as a physical media player. Generally speaking, a physical media rendering device can be a network attached device that may be coupled to an audio or video system, and renders (plays) audio or video content stored on network accessible storage devices on the audio or video system coupled to the physical media rendering device. In the example system illustrated in FIG. 1, physical media rendering devices A 106, B 108 and C 110 may each implement a different media rendering control protocol. For example, physical media rendering device A 106 may be an Orb player implementing an Orb CAB protocol. Physical media rendering device B 108 may implement an AllJoyn protocol. Physical media rendering device C 110 may implement a UPnP/DLNA protocol. The specific media rendering control protocols are provided as examples, the embodiments described herein are not limited to any particular media rendering control protocol and various embodiments may implement any of a number of available media rendering control protocols now known or developed in the future.

Although the example system illustrated in FIG. 1 shows three physical media rendering devices, the embodiments are not limited to any particular number of physical media rendering devices. A system may include fewer physical media rendering devices or it may include more physical media rendering devices.

Media rendering device controller 104 may comprise control software and/or hardware that controls a physical media rendering device. Media rendering device controller 104 may be implemented on any of a variety of devices, including mobile phones, personal computers, laptop computers, tablet computers, etc. Media rendering device controller 104 may provide a user interface allowing a user to select media to be played, start play, stop play, pause play, rewind, fast forward, skip to the start or end of media, record, eject, shuffle, repeat play, control volume etc. through a physical media rendering device. In the example illustrated in FIG. 1, media rendering device controller 104 can implement media rendering control protocol C and therefore can be compatible with physical media rendering device C 110. Because physical media rendering device A 106 and physical media rendering device B 108 may implement different protocols (e.g., protocol A and protocol B) from that implemented by media rendering device controller 104, media rendering device controller 104 may not be able to directly control physical media rendering devices 106 and 108. Further, because the protocols used by physical media rendering devices 106 and 108 may be different from media rendering device controller 104, media rendering device controller 104 may fail to discover physical media rendering devices 106 and 108 and thus may not be aware of the existence of physical media rendering devices 106 and 108 on the network.

Host device 102 may be any type of network capable computing device. Examples of such devices include mobile phones, personal computers, laptop computers, tablet computers, etc. In some embodiments, host device 102 may include a virtual media rendering unit including software, firmware, or embedded logic that implements a virtual media rendering device. A virtual media rendering device may be used as a proxy for a physical media rendering device. In some embodiments, a virtual media rendering device may accept commands and data in a common media rendering protocol (also referred to herein as "common protocol") and convert the commands and data to a protocol supported by the physical media rendering device that is proxied (i.e., represented) by the virtual media rendering device. In the example illustrated in FIG. 1, protocol C may be the common protocol. Host device 102 may provide two virtual media rendering devices, virtual media rendering unit A 114 implements virtual media rendering device A 124 and virtual media rendering unit B 116 implements virtual media rendering device B 126. Virtual media rendering unit A 114 may implement a virtual media rendering device 124 as a proxy representing physical media rendering device A 106. Virtual media rendering unit A 114 may communicate with media rendering device controller 104 using the common protocol (in this example, protocol C) and convert commands and data received from the media rendering device controller 104 to commands and data conforming to protocol A supported by physical media rendering device A 106. Virtual media rendering unit B 116 may implement virtual media rendering device 126 as a proxy representing physical media rendering device B 108. Virtual media rendering unit B 116 may communicate with media rendering device controller 104 using the common protocol and convert commands and data received from the media rendering device controller 104 to commands and data conforming to protocol B supported by physical media rendering device B 108. Virtual media rendering devices 124 and 126 are illustrated in dashed lines to represent that while the virtual media rendering devices appear to be physical devices to other devices on the network and are discoverable by other devices in the network, in actuality they are not physical devices, but rather virtual devices implemented by host device 102 and virtual media rendering units 114 and 116. Thus in some embodiments, a media rendering device controller supporting a common protocol can control physical media rendering devices that do not support the common protocol through virtual media rendering devices that are proxies for the physical media rendering devices.

In some embodiments, host device 102 may create a virtual media rendering device in response to discovering a physical media rendering device that does not support the common protocol. For example, host device 102 may discover that an AllJoyn device has communicably coupled to network 112. In response, host device 102 may initialize a virtual media rendering unit that implements a virtual media rendering device to proxy the AllJoyn device. In some embodiments, a virtual media rendering unit may implement one virtual media rendering device that proxies one physical media rendering device. In alternative embodiments, a virtual media rendering unit may implement multiple virtual media rendering device to proxy multiple physical media rendering devices of the same protocol. For example, a virtual media rendering unit may implement multiple virtual media rendering devices that are proxies for multiple physical media rendering devices that each support an AllJoyn protocol. In further alternative embodiments, a virtual media rendering unit may implement multiple virtual media rendering devices supporting multiple protocols.

Figure 2:
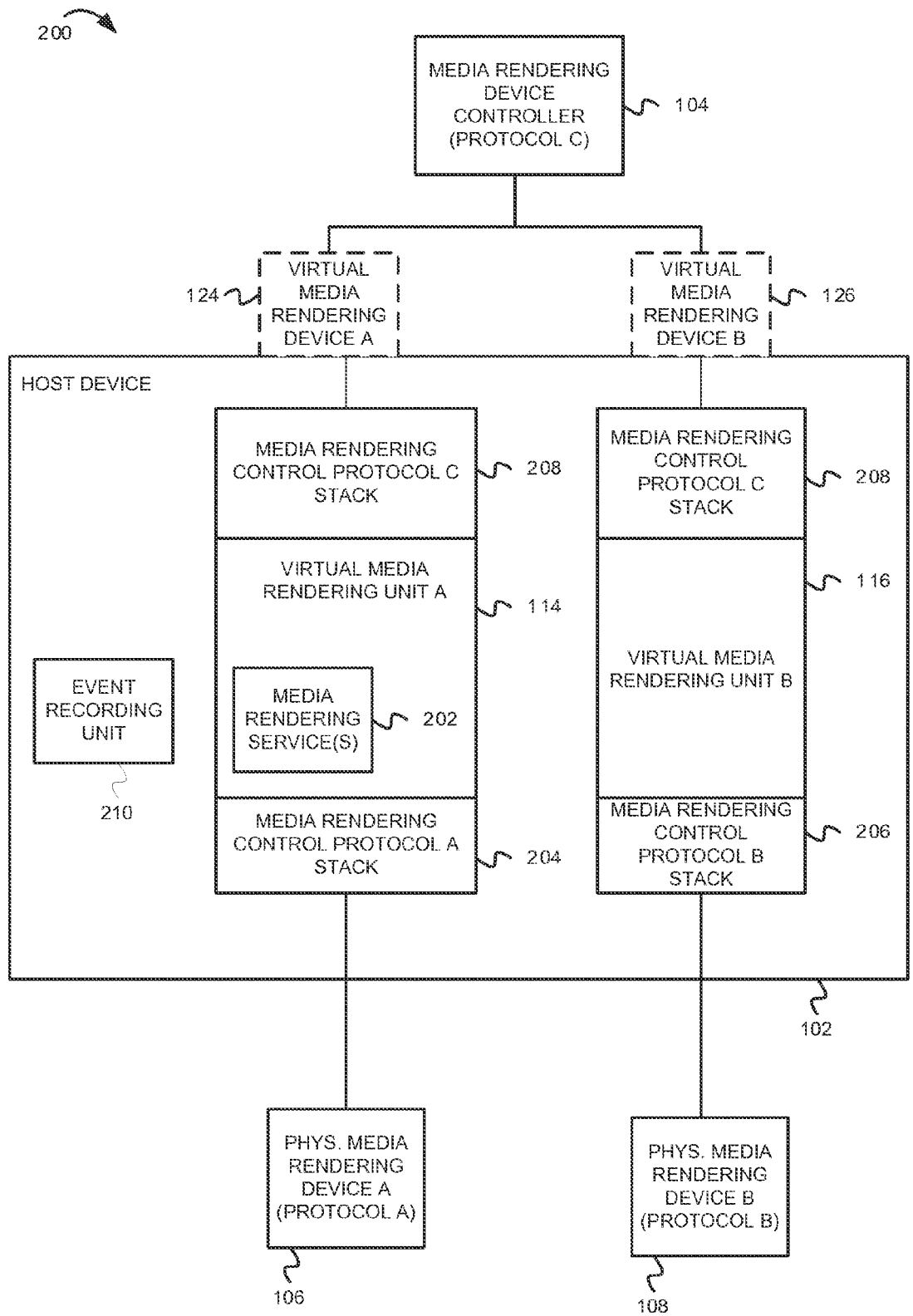
FIG. 2 is a block diagram providing further details of a host device that implements virtual media rendering devices.

FIG. 2 is a block diagram providing further details of host device 102 that includes virtual media rendering units that implement virtual media rendering devices. In some embodiments, host device 102 may include protocol stacks for various media rendering control protocols. In the example illustrated in FIG. 2, host device 102 may include a media rendering protocol A stack 204, media rendering protocol B stack 206 and media rendering protocol C stack 208. Each of the media rendering control protocol stacks 204, 206 and 208 may include functionality allowing host device 102 to communicate commands and data with a peer component (e.g., media rendering device controller 104, physical media rendering device A 106 and physical media rendering device B 108) such that the peer component receives the commands and data and properly interprets the commands and data. As noted above, the media rendering control protocol stacks may implement the Orb CAB protocol, the AllJoyn protocol, the UPnP/DLNA protocol, or other media rendering control protocols now known or developed in the future. In some embodiments, one of the media rendering control protocol stack provided on host device 102 can be a common protocol stack that may be supported across one or more virtual media rendering devices that may exist on host device 102. In the example illustrated in FIG. 2, media rendering control protocol C is the common media rendering control protocol. In some implementations, the UPnP/DLNA protocol may be the common media rendering control protocol. It is desirable that the common media rendering control protocol comprise a protocol that can be supported by a variety of different media rendering device controllers and other peer devices.

Generally speaking, the media rendering control protocol stacks 204, 206 and 208 implement a communication protocol where media rendering device controllers can issue commands and data to control a physical media rendering device and receive responses to the commands and data from the physical media rendering device. As an example, a media rendering control protocol may define commands and data structures that provide a source location for audio or video data and cause the physical media rendering device to retrieve the data. In addition, other commands and data structures, when communicated to a physical media rendering device, may cause the physical media rendering device to start play, stop play, pause play, rewind, fast forward, skip to the start or end of media, record, eject, shuffle, repeat play, control volume etc.

In addition, a media rendering control protocol stack may implement a device discovery protocol. Thus in some embodiments, host device 102 can use the device discovery protocols for the protocols supported on host device 102 to learn which devices are currently on a network. In response to discovering a physical media rendering device that does not implement the common media rendering control protocol, host device 102 can create a virtual media rendering device to serve as a proxy for the physical media rendering device. In some embodiments, the virtual media rendering unit implementing the virtual media rendering device may include one or more media rendering services. Examples of such services include transport services, rendering control services and connection manager services. A rendering control service may provide a set of actions that specify how a physical media rendering device is to render incoming content. This includes rendering characteristics such as brightness, contrast, volume, mute, etc. The rendering control service may also provide actions that specify how a physical media rendering device is to "mix together" one or more content items (e.g. a Picture-in-Picture window on a TV or an audio mixer). A transport service may specify actions that can cause a physical media rendering device to control the flow of the content. For example, a transport service may specify commands to cause a physical media rendering device to start play, stop play, pause, seek, etc. A connection manager service may implement actions that provide information about a physical media rendering device to a requester. Such information may include the transfer or data protocols (e.g., WMA, MP3, AVI etc.) that a physical media rendering device supports.

Host device 102 may optionally include an event recording unit 210. Event recording unit 210 may receive various events from the virtual media rendering units instantiated on host device 102. Examples of such events include selection of content events, play events, pause events, etc. Event recording unit 210 can store data related to the event (e.g., title of content, duration of play etc.) for analysis. The analysis may be performed on host device 102. Alternatively, the event data may be forwarded to another system for analysis. In some embodiments, the event data from multiple virtual media rendering units may be aggregated so that a more complete picture of the use of audio and video content by a user or users on a network may be performed. For example, assume that a number of physical media rendering devices exist on a network, where the physical media rendering devices do not support a common protocol. Host device 102 may create virtual media rendering units as proxies for the physical media rendering devices. As requests to play content on the physical media rendering devices are received by the virtual media rendering devices, event data comprising the titles of audio or video content that were requested to be played may be recorded by event recording unit 210. The event data for the titles played by the physical media rendering devices may be aggregated based on events reported by the virtual media rendering units in order to provide an analysis of the titles played on the network as a whole. As an example, the aggregated data may be useful in systems that provide suggested new content or target advertising based on the type of content played in a home network environment.

Further details on the operation of a host device 102 are provided below with respect to FIGS. 3-6.

Figure 3:
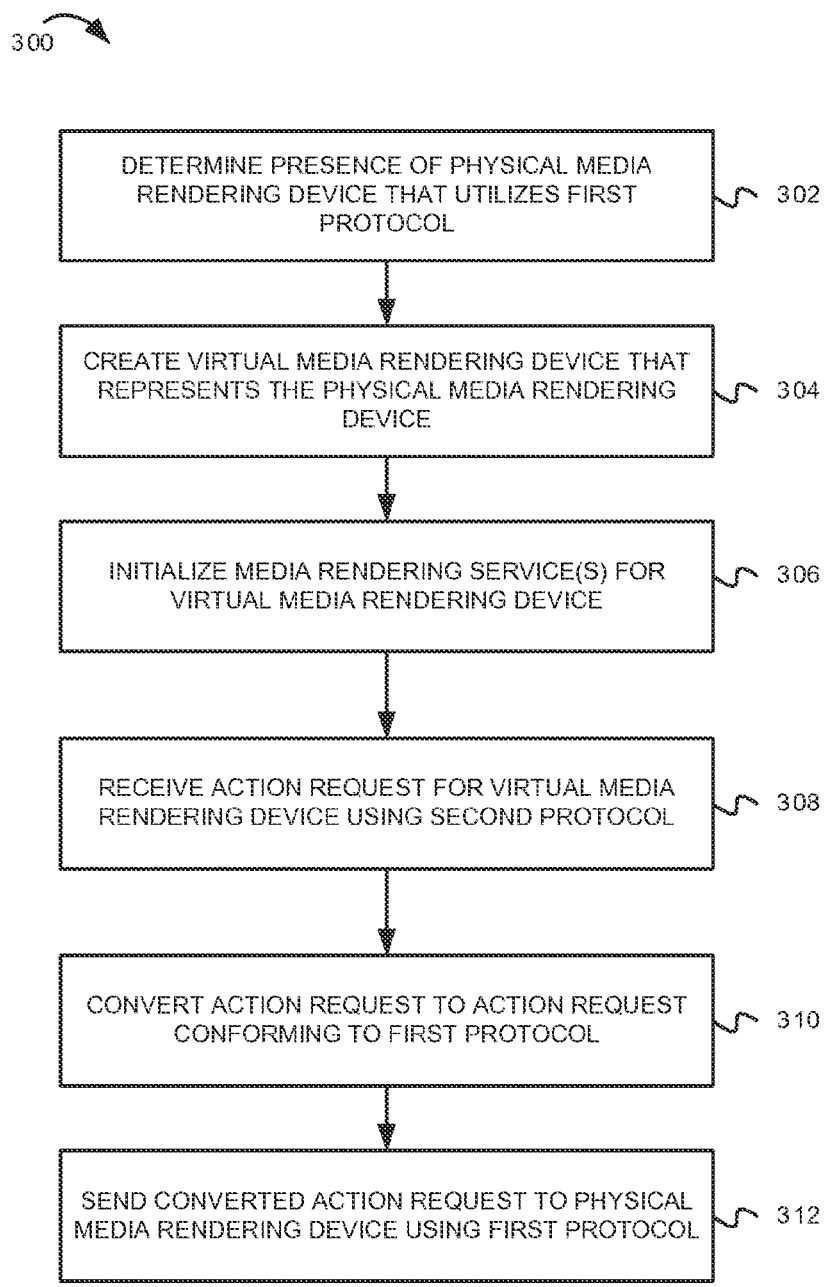
FIG. 3 is a flowchart illustrating a method for discovering and controlling multiple physical media rendering devices that use different networking protocols.

FIG. 3 is a flowchart illustrating a method 300 for discovering and controlling multiple physical media rendering devices that use different media rendering control protocols. Method 300 begins at block 302 with determining the presence of a physical media rendering device on a network, where the physical media rendering device utilizes a media rendering control protocol that is not the designated media rendering control common protocol (protocol C in the examples provided above in FIGS. 1 and 2). Host device 102 may use the discovery protocols for the various protocol stacks implemented on host device 102 to determine the presence of a physical media rendering device. In some cases, the discovery protocol may specify that host device 102 listen on the network for device presence announcements that may be provided by a physical media rendering device when power is applied to the physical media rendering device or at periodic intervals. In alternative cases, the discovery protocol may specify that host device 102 poll the network to determine which physical media rendering devices may be present on the network. In further cases, host device 102 may receive configuration data that indicates which physical media rendering devices may be present on the network.

At block 304, host device 102 can create a virtual media rendering device that is a proxy for the physical media rendering device discovered at block 302. The creation and availability of the newly created virtual media rendering device may be announced on the network using a discovery protocol. The discovery protocol may be supported by the common protocol or it may be a separate protocol from the common protocol. From the perspective of other devices on the network, the newly created virtual media rendering device appears as a physical media rendering device that supports the designated common media rendering control protocol.

At block 306, host device 102 can optionally initialize one or more media rendering services associated with the virtual media rendering device created at block 304. For example, host device 102 may initialize a transport service, a connection manager service and a rendering control service. The initialization of such services and the choice of services to initialize may depend on the media rendering control protocol that is selected as the common protocol.

At block 308, the virtual media rendering device can receive an action request via the common protocol stack. As noted above, the action request may be a request to obtain audio or video content from a source, play the content, stop play of the content, fast forward, skip, rewind etc.

At block 310, the virtual media rendering unit implementing the virtual device can convert the action request received via the common protocol stack to an action request that conforms to the media rendering control protocol used by the physical media rendering device being proxied by the virtual media rendering device. In some embodiments, the conversion may be performed using wrapper functions. For example, a transport service associated with a virtual media rendering unit may provide functions that, when invoked, requests that a physical media rendering device perform an action associated with the function (e.g., start play, stop play, fast forward, skip etc.). In implementations using a wrapper function, the wrapper function may be invoked in response to receiving an action request via the protocol stack for the common media rendering control protocol. The wrapper function may perform data conversion on some or all of the parameters supplied to the wrapper function and supplies the converted parameters to a corresponding function implemented in the media rendering control protocol stack for the physical media rendering device. It should be noted that a call to a wrapper function may result in multiple calls to functions within the media rendering control protocol stack for the physical media rendering device in order to implement the behavior expected by the common protocol. For example, assume that a rewind function implemented by the common media rendering control protocol causes devices supporting the common media rendering control protocol to rewind regardless of whether the physical media rendering device is currently playing content or not. Further assume that a physical media rendering device proxied by a virtual media rendering device requires that play of the content be stopped before a rewind request is honored. In this example, a call to the rewind wrapper function through the common media rendering control protocol stack may be expanded into two function calls to the protocol stack for the media rendering control protocol associated with the physical media rendering device. A first call issues a stop play request to the physical media rendering device, and a second call issues the rewind request to the physical media rendering device.

At block 312, the converted action request can be transmitted to the physical media rendering device proxied by the virtual media rendering device using the protocol supported by the physical media rendering device.

It should be noted that responses to action requests may be handled in a reverse manner to the method above. That is, a response to an action request may be provided by the physical media rendering device through the protocol stack supported by the physical media rendering device. The response may be converted by the virtual media rendering unit implementing the virtual media rendering device that is the proxy for the physical media rendering device to a response that conforms to the common protocol. The converted response is then sent to the action requester.

At some point after a virtual media rendering device has been created as a proxy for a physical media rendering device, the physical media rendering device may be removed from the network. For example, the physical media rendering device may be turned off, disconnected from the network, or otherwise made unavailable to the network. In such cases, host device 102 may remove the virtual physical media rendering device associated with the removed physical media rendering device. Host device 102 may issue a loss event to the network to inform other devices on the network that the virtual media rendering device is being removed from the network.

Figure 4:
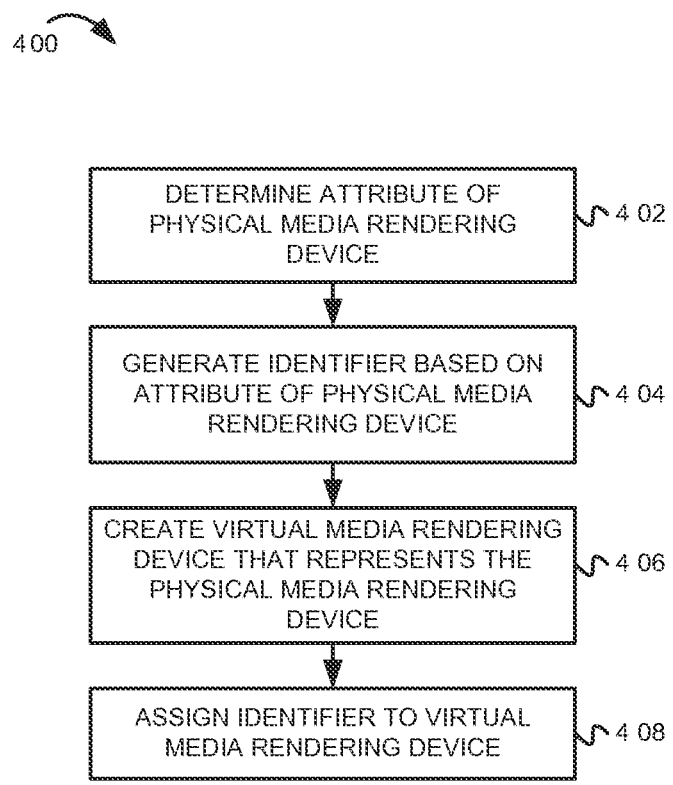
FIG. 4 is a flowchart illustrating a method for assigning an identifier to a virtual media rendering device.

FIG. 4 is a flowchart illustrating a method 400 for assigning an identifier to a virtual media rendering device. Typically an identifier is assigned when a virtual media rendering device is created by host device 102. The method begins at block 402 by determining one or more attributes of a physical media rendering device discovered by host device 102. The attribute may be a device name, a model name, a network address, a UUID (Universally Unique Identifier) or other attribute associated with the physical media rendering device.

At block 404, host device 102 can generate an identifier, based at least in part, on one or more attributes. For example, assume that the physical media rendering device is an AllJoyn player at network address 198.0.0.2. Host device 102 may generate "AllJoyn_198_0_0_2" as an identifier.

At block 406, host device 102 can create a virtual media rendering device to serve as a proxy for the discovered physical media rendering device as described above with respect to FIG. 3.

At block 408, host device 102 can assign the identifier generated at block 404 to the virtual media rendering device. Host device 102 may announce the presence of the virtual media device on the network using the assigned identifier. Other devices on the network, for example, a media rendering device controller, may discover the identifier as part of a discovery protocol resulting in discovery of the virtual media rendering device by the other devices. The other devices may then use the identifier as a label for the virtual media rendering device. For example, a media rendering device controller may display the identifier in a user interface. A user that wants to control the physical media rendering device proxied by the virtual media rendering device may select the identifier for the virtual media rendering device from a list of available media rendering devices, and select operations to be performed by the selected virtual media rendering device.

Figure 5:
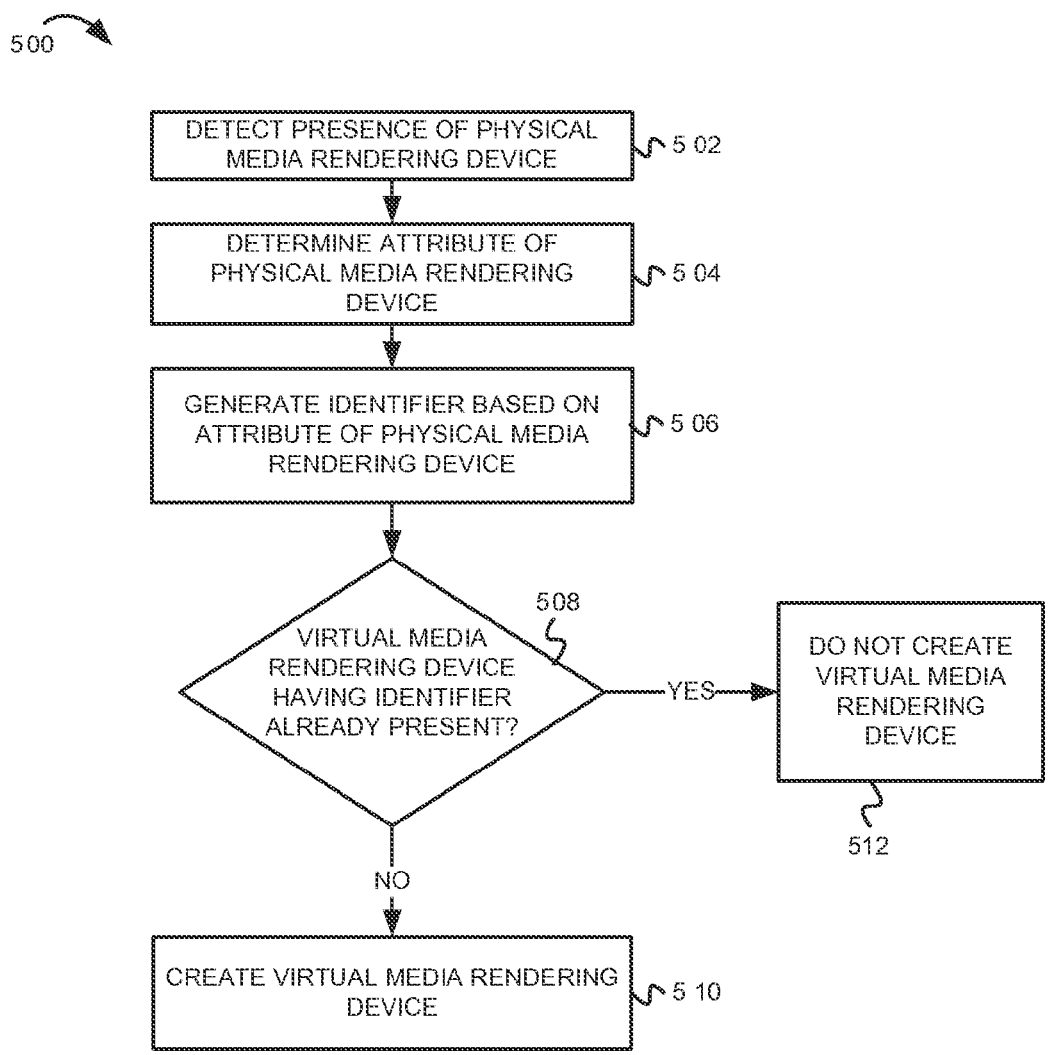
FIG. 5 is a flowchart illustrating a method for creating a virtual media device.

FIG. 5 is a flowchart illustrating a method 500 for creating a virtual media device. It is possible that multiple host devices may be present on a network. For example, assume that a personal computer on a wireless network is acting a host device for virtual media rendering devices. Further assume that a mobile phone comes within range of the wireless network and is also configured to act as a host device. If both the personal computer and the mobile phone create virtual media rendering devices to represent the same physical media rendering device, user confusion and inconsistent device behavior may result. Thus in some embodiments, method 500 can be used to prevent creation of duplicate virtual media rendering devices. Method 500 begins at block 502 by detecting the presence of a physical media rendering device on a network. As noted above, a discovery protocol may be used to detect the physical media rendering device.

At block 504, host device 102 can determine one or more attributes of the physical media rendering device. As with block 402 described above, host device 102 may determine a device name, a model name, a network address, a UUID (Universally Unique Identifier) or other attribute associated with the discovered physical media rendering device.

At block 506, host device 102 can generate an identifier based on the one or more attributes determined at block 504. It may be desirable that host devices that provide virtual media rendering devices use the same attributes and the same algorithm to generate the identifier.

At block 508, host device 102 can determine if a virtual media rendering device having the identifier generated at block 506 already exists on the network. Host device 102 may use a discovery protocol conforming to the designated common media rendering control protocol in order to determine if such a virtual media rendering device already exists on the network.

If a virtual media rendering device having the identifier generated at block 506 is not detected on the network, then at block 510, host device 102 can create a virtual media rendering device to serve as a proxy for the physical media rendering device discovered at block 502.

If a virtual media rendering device having the identifier generated at block 506 already exists on the network, then at block 512, host device 102 does not create a virtual media rendering device.

Figure 6:
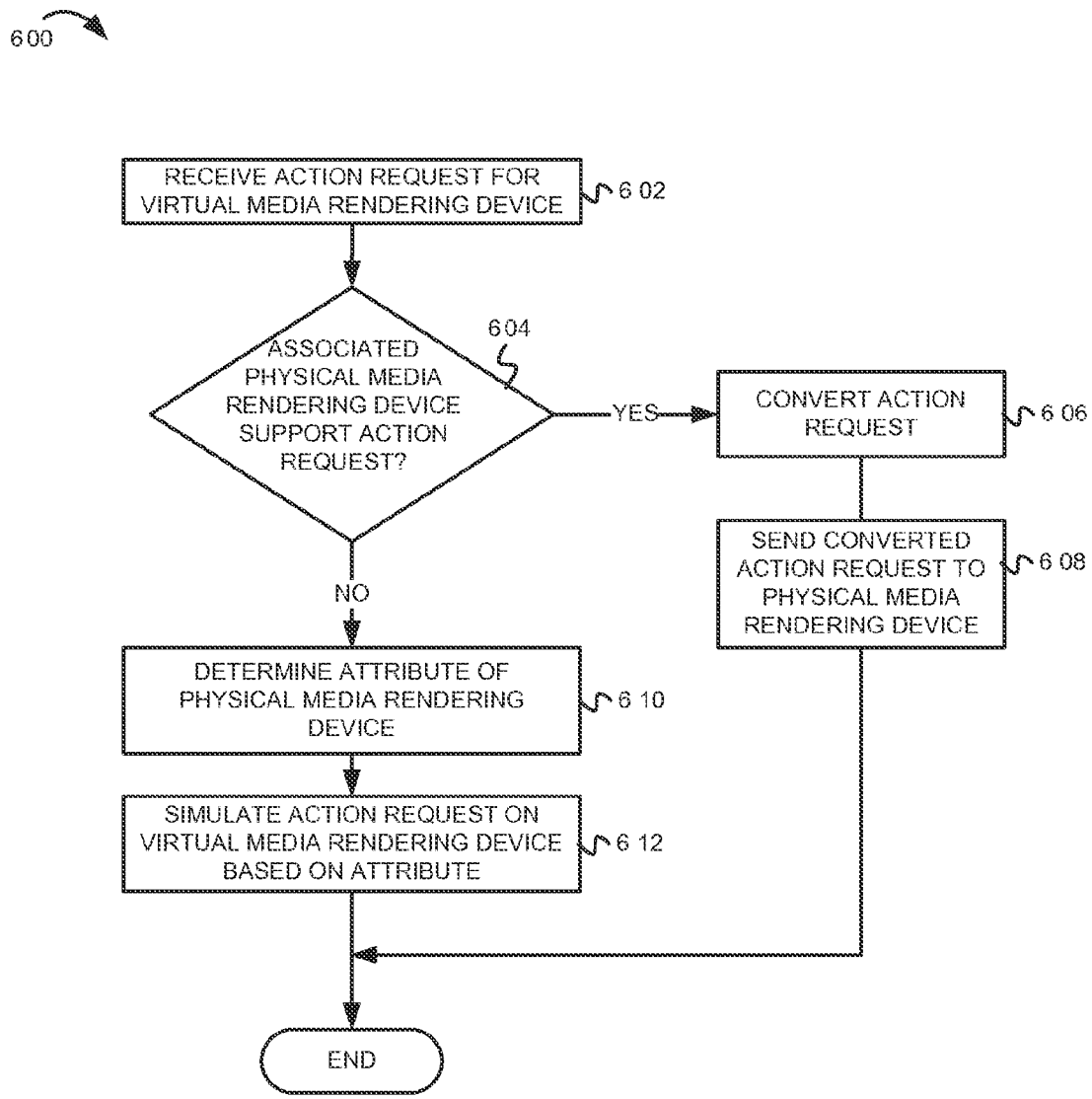
FIG. 6 is a flowchart illustrating a method for processing an action request in a virtual media rendering device.

FIG. 6 is a flowchart illustrating a method 600 for processing an action request in a virtual media rendering device. Method 600 begins at block 602 by receiving an action request at a virtual media rendering device. The action request may be a request for information, or a request to cause the physical media rendering device proxied by the virtual media rendering device perform an action such as obtain video or audio content, start play of the content, stop play of the content, skip, fast forward etc.

At block 604, the virtual media rendering unit implementing the virtual media rendering device can determine if the physical media rendering device supports the action request. If the physical media rendering device supports the action request, then at block 606, the virtual media rendering unit can convert the action request to the media rendering control protocol supported by the physical media rendering device as described above with reference to FIG. 4. At block 608 the action request can be transmitted to the physical media rendering device using the media rendering control protocol supported by the physical media rendering device.

If at block 604 the virtual media rendering unit determines that the physical media rendering device proxied by the virtual media rendering device does not support the action request, then at block 610 the virtual media rendering unit can determine one or more attributes of the physical media rendering device. The one or more attributes may be obtained by the virtual media rendering unit from the physical media rendering device. Alternatively, the attributes may be data that is configured or otherwise stored on host device 102.

At block 612, the virtual media rendering unit can simulate (i.e., emulate) execution of the action request on behalf of the proxied physical media rendering device. The simulation of the execution of the action request may include providing a simulated response to the requester.

As an example of the above, assume that a physical media rendering device is an audio player that is only capable of playing audio files having an MP3 format. Further assume that the physical media rendering device does not support requests for information regarding audio formats supported by the physical media rendering device. A virtual media rendering device acting as a proxy to the physical media rendering device may receive a request from a media rendering device controller for the audio formats supported by the virtual media rendering device. The virtual media rendering unit implementing the virtual media rendering device determines that the physical media rendering device does not support the request. However, the virtual media rendering unit can be configured to simulate execution of the request by providing a response to the requester that includes data indicating that the physical media rendering device supports the MP3 format. The above example is but one example of the many possible action requests that may be simulated by a virtual media rendering unit. The embodiments are not limited to any particular simulation of action requests.

Embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer usable program code embodied in the medium.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. A computer-readable storage medium excludes signal media that may include a propagated signal.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations of the embodiments may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (for example, through the Internet using an Internet Service Provider).

Figure 7:
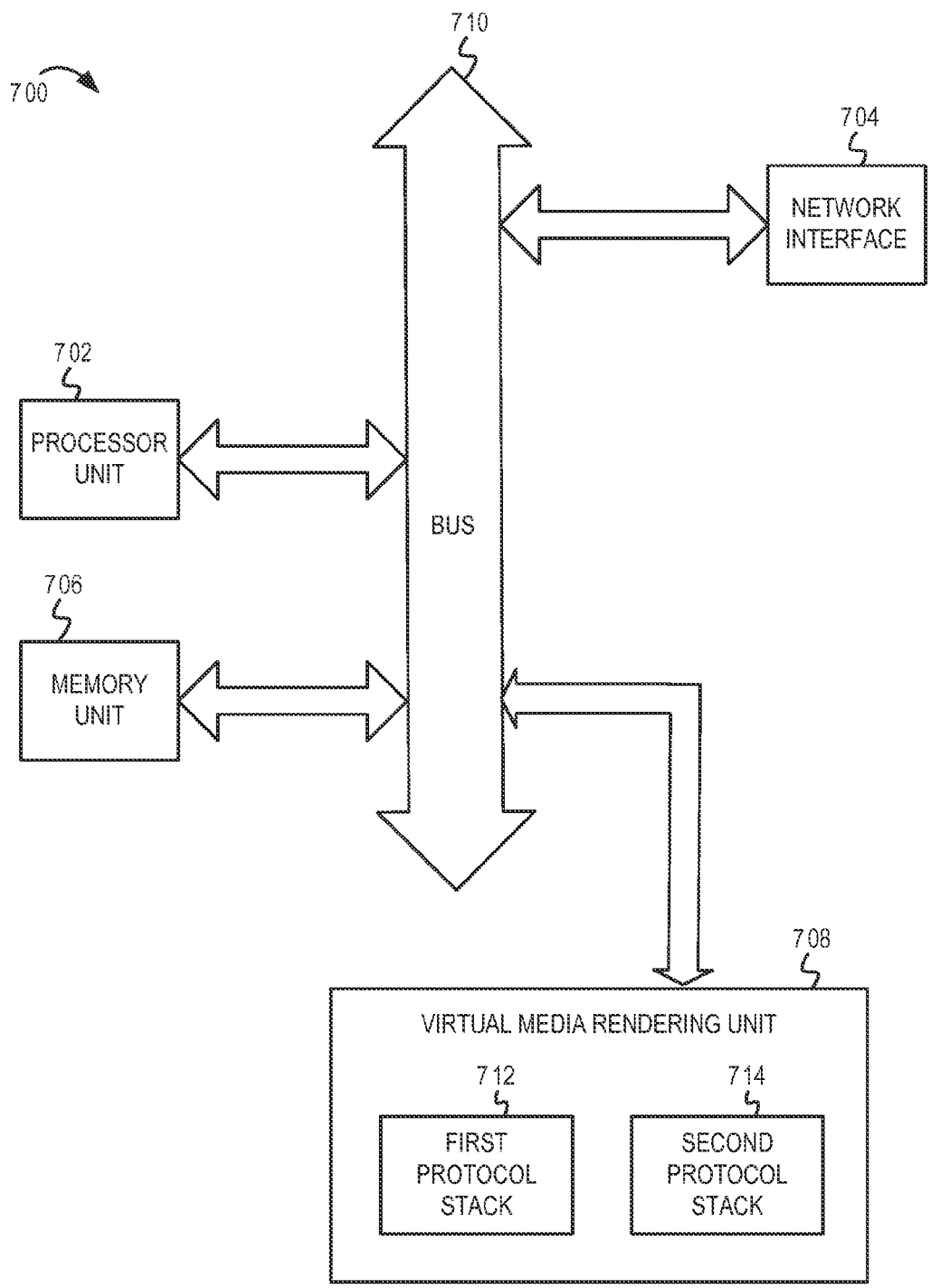
FIG. 7 is an example block diagram of one embodiment of an electronic device for implementing virtual media rendering devices.

FIG. 7 is an example block diagram of one embodiment of an electronic device 700 including a virtual media rendering device in accordance with various embodiments of this disclosure. In some implementations, the electronic device 700 may be one of a laptop computer, a netbook, a mobile phone, a powerline communication device, a personal digital assistant (PDA), or other electronic systems. The electronic device 700 includes a processor unit 702 (possibly including multiple processors, multiple cores, multiple nodes, and/or implementing multi-threading, etc.). The electronic device 700 includes a memory unit 706. The memory unit 706 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The electronic device 700 also includes a bus 710 (e.g., PCI, ISA, PCI-Express, Hyper-Transport®, InfiniBand®, NuBus, AHB, AXI, etc.), and network interface 704, that may be at least one of a wireless network interface (e.g., a WLAN interface, a Bluetooth® interface, a WiMAX interface, a ZigBee® interface, a Wireless USB interface, etc.) or a wired network interface. In one example embodiment the first network interface 704 may comprise a 2.4 GHz or 5 GHz wireless interface capable of utilizing IEEE 802.11a, 802.11b, 802.11g, 802.11n, or 802.11ac protocol. The electronic device 700 also includes a virtual media rendering unit 708. The virtual media rendering unit 708 may include a first protocol stack 712 and a second protocol stack 714. As described above in FIGS. 1-7, the virtual media rendering unit 708 may implement functionality to control physical media rendering devices (not shown in FIG. 7). Further, realizations may include fewer or additional components not illustrated in FIG. 7 (e.g., video cards, audio cards, additional network interfaces, peripheral devices, etc.). The processor unit 702, the memory unit 706, and the network interface 704 are coupled to the bus 710. Although illustrated as being coupled to the bus 710, the memory unit 706 may be coupled to the processor unit 702.

While the embodiments are described with reference to various implementations and exploitations, it will be understood that these embodiments are illustrative and that the scope of the inventive subject matter is not limited to them. In general, techniques for discovering and controlling physical media rendering devices that utilize different network protocols as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method for controlling media rendering devices, the method comprising:
   determining presence of a physical media rendering device on a network, the physical media rendering device using a first media rendering control protocol;
   in response to determining the presence of the physical media rendering device, creating a virtual media rendering proxy representing the physical media rendering device, the virtual media rendering proxy using a second media rendering control protocol;
   receiving an action request conforming to the second media rendering control protocol, the action request for an action not supported by the physical media rendering device; and
   in response to determining that the action is not supported by the physical media rendering device, bypassing conversion of the action request to the first media rendering control protocol and determining, by the virtual media rendering proxy, a response that supports the action.

2. The method of claim 1, further comprising:
   determining an attribute of the physical media rendering device; and
   generating a device identifier for the virtual media rendering proxy based, at least in part, on the attribute.

3. The method of claim 2, further comprising:
   determining if the virtual media rendering proxy having the device identifier is present on the network; and
   in response to determining that the virtual media rendering proxy having the device identifier is present on the network, determining not to create a duplicate virtual media rendering proxy.

4. The method of claim 1, wherein the second media rendering control protocol comprises a UPnP (Universal Plug and Play) protocol.

5. The method of claim 1, further comprising:
   determining presence of the physical media rendering device in response to a discovery event of a first discovery protocol; and
   in response to creating the virtual media rendering proxy, advertising the presence of the virtual media rendering proxy using a second discovery protocol.

6. The method of claim 1, further comprising:
   determining that the physical media rendering device is no longer present on the network; and
   in response to determining that the physical media rendering device is no longer present, removing the virtual media rendering proxy.

7. The method of claim 1, further comprising:
   in response to the action request received by the virtual media rendering proxy, storing an event record associated with the action request.

8. The method of claim 1, further comprising:
   initializing a media rendering service associated with the virtual media rendering proxy;
   wherein receiving, via the second media rendering control protocol, the action request includes receiving the action request at the media rendering service.

9. The method of claim 1, wherein determining, by the virtual media rendering proxy, the response comprises emulating, by the virtual media rendering proxy, execution of the action request.

10. The method of claim 1, wherein determining, by the virtual media rendering proxy, the response comprises determining the response based, at least in part, on a characteristic of the physical media rendering device.

11. The method of claim 1, further comprising:
    receiving, from each of a plurality of virtual media rendering proxies, event data in response to action requests received by the plurality of virtual media rendering proxies; and
    aggregating the event data.

12. The method of claim 11, wherein aggregating the event data comprises aggregating event data for titles of content played by a plurality of physical media rendering devices associated with the plurality of virtual media rendering proxies.

13. An apparatus comprising:
    a processor; and
    a virtual media rendering unit executable by the processor, the virtual media rendering unit configured to:
        create a virtual media rendering proxy representing a physical media rendering device,
        receive via a first media rendering control stack for a first media rendering control protocol an action request, the action request conforming to the first media rendering control protocol, the action request for an action not supported by the physical media rendering device,
        in response to a determination that the action is not supported by the physical media rendering device, bypass conversion of the action request to a second media rendering control protocol and determine a response to the action request that supports the action.

14. The apparatus of claim 13, wherein the virtual media rendering unit is configured to:
    determine presence of the physical media rendering device on a network; and
    in response to determining the presence of the physical media rendering device, create the virtual media rendering proxy representing the physical media rendering device.

15. The apparatus of claim 13, wherein the virtual media rendering unit is configured to:
    determine an attribute of the physical media rendering device; and
    generate a device identifier for the virtual media rendering proxy based, at least in part, on the attribute.

16. The apparatus of claim 15, wherein the virtual media rendering unit is configured to:
    determine if the virtual media rendering proxy having the device identifier is present on a network; and
    in response to determining that the virtual media rendering proxy having the device identifier is present on the network, determine not to create a duplicate virtual media rendering proxy.

17. The apparatus of claim 13, wherein the first media rendering control protocol comprises a UPnP (Universal Plug and Play) protocol.

18. The apparatus of claim 13, wherein the virtual media rendering unit is further configured to:
    determine presence of the physical media rendering device in response to a discovery event of a first discovery protocol; and
    advertise the presence of the virtual media rendering proxy using a second discovery protocol.

19. The apparatus of claim 13, wherein the virtual media rendering unit is further configured to:
    determine that the physical media rendering device is no longer present on a network; and
    in response to determining that the physical media rendering device is no longer present, remove the virtual media rendering proxy.

20. The apparatus of claim 13, wherein the virtual media rendering unit is further configured to:
    in response to receipt of the action request, store an event record associated with the action request.

21. A computer readable storage medium having stored thereon instructions, that when executed, cause a processor to perform operations comprising:
    determining presence on a network of a physical media rendering device, the physical media rendering device using a first media rendering control protocol;
    in response to determining the presence of the physical media rendering device, creating a virtual media rendering proxy representing the physical media rendering device, the virtual media rendering proxy using a second media rendering control protocol;
    receiving an action request conforming to the second media rendering control protocol, the action request for an action not supported by the physical media rendering device; and in response to determining that the action is not supported by the physical media rendering device, bypassing conversion of the action request to the first media rendering control protocol and determining, by the virtual media rendering proxy, a response to the action request that supports the action.

22. The computer readable storage medium of claim 21, wherein the operations further comprise:

determining an attribute of the physical media rendering device; and generating a device identifier for the virtual media rendering proxy based, at least in part, on the attribute.

23. The computer readable storage medium of claim 22, wherein the operations further comprise:

determining if the virtual media rendering proxy having the device identifier is present on the network; and in response to determining that the virtual media rendering proxy having the device identifier is present on the network, determining not to create a duplicate virtual media rendering proxy.

24. The computer readable storage medium of claim 21, wherein the second media rendering control protocol comprises a UPnP (Universal Plug and Play) protocol.

25. The computer readable storage medium of claim 21, wherein the operations further comprise:

determining presence of the physical media rendering device in response to a discovery event of a first discovery protocol; and advertising the presence of the virtual media rendering proxy using a second discovery protocol.

26. The computer readable storage medium of claim 21, wherein the operations further comprise:

determining that the physical media rendering device is no longer present on the network; and in response to determining that the physical media rendering device is no longer present, removing the virtual media rendering proxy.

27. The computer readable storage medium of claim 21, wherein the operations further comprise:

in response to the action request received by the virtual media rendering proxy, storing an event record associated with the action request.

28. The computer readable storage medium of claim 21, wherein the operations further comprise:

initializing a media rendering service associated with the virtual media rendering proxy;

wherein receiving, via the second media rendering control protocol, the action request includes receiving the action request at the media rendering service.

* * * * *